Sept. 5, 1961 L. E. ELFES 2,998,735
DRIVE AXLE GEARING ASSEMBLY
Filed April 15, 1959

INVENTOR.
LEE E. ELFES
BY Wolfe, Hubbard,
Voit & Osann
ATTORNEYS.

United States Patent Office 2,998,735
Patented Sept. 5, 1961

2,998,735
DRIVE AXLE GEARING ASSEMBLY
Lee E. Elfes, Birmingham, Mich., assignor to Massey-Ferguson Inc., Racine, Wis., a corporation of Maryland
Filed Apr. 15, 1959, Ser. No. 806,693
4 Claims. (Cl. 74—801)

The present invention relates generally to the drive axle assemblies of agricultural tractors or the like, and concerns more particularly an axle having a planetary gear system supplying power to tractor drive wheels.

In the larger, more powerful tractors it has been proposed that gear reduction systems be incorporated in the rear axle assemblies adjacent the power utilizing rear wheels. In this way, the tractor power plant and power train can be operated at lower torques, but higher speeds, and still supply the necessary power. At the wheels, the gear reduction systems convert the power to the slow speeds, high torques required by the tractor drive wheels.

A particularly effective rear axle construction for accomplishing the above objective is shown in application Serial No. 771,388, filed November 3, 1958, and assigned to the assignee of the present invention. This construction utilizes a pair of planetary gear reduction systems in the rear axle assembly of the tractor, and it is with such systems that the present invention is concerned.

It is an object of the invention to provide a novel drive axle planetary gear system assembly which is arranged so that the parts are solidly supported by friction reducing bearings without looseness or play.

It is also an object to provide a gear system assembly of the above type whose parts may be formed with normal production manufacturing tolerances since the assembly has self-adjusting flexibility.

Furthermore, it is an object to provide a gear system assembly as characterized above which is very rugged for heavy duty applications, while being quite economical to manufacture and capable of rapid, easy assembly.

Figure 1:
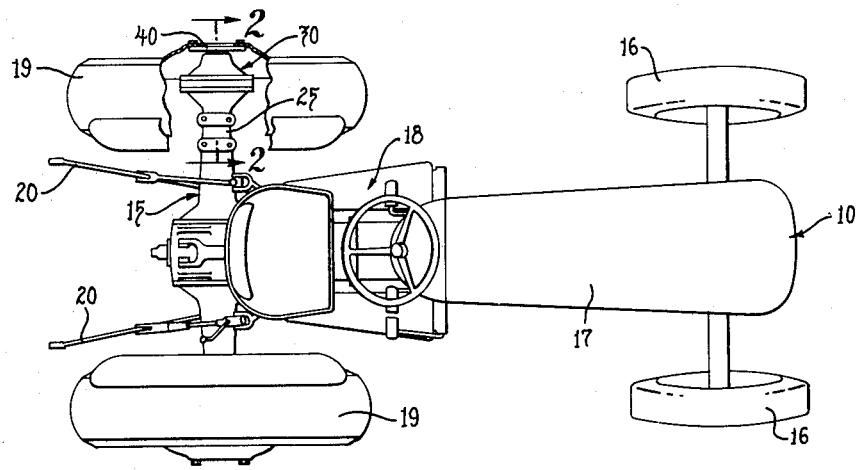
Figure 2:
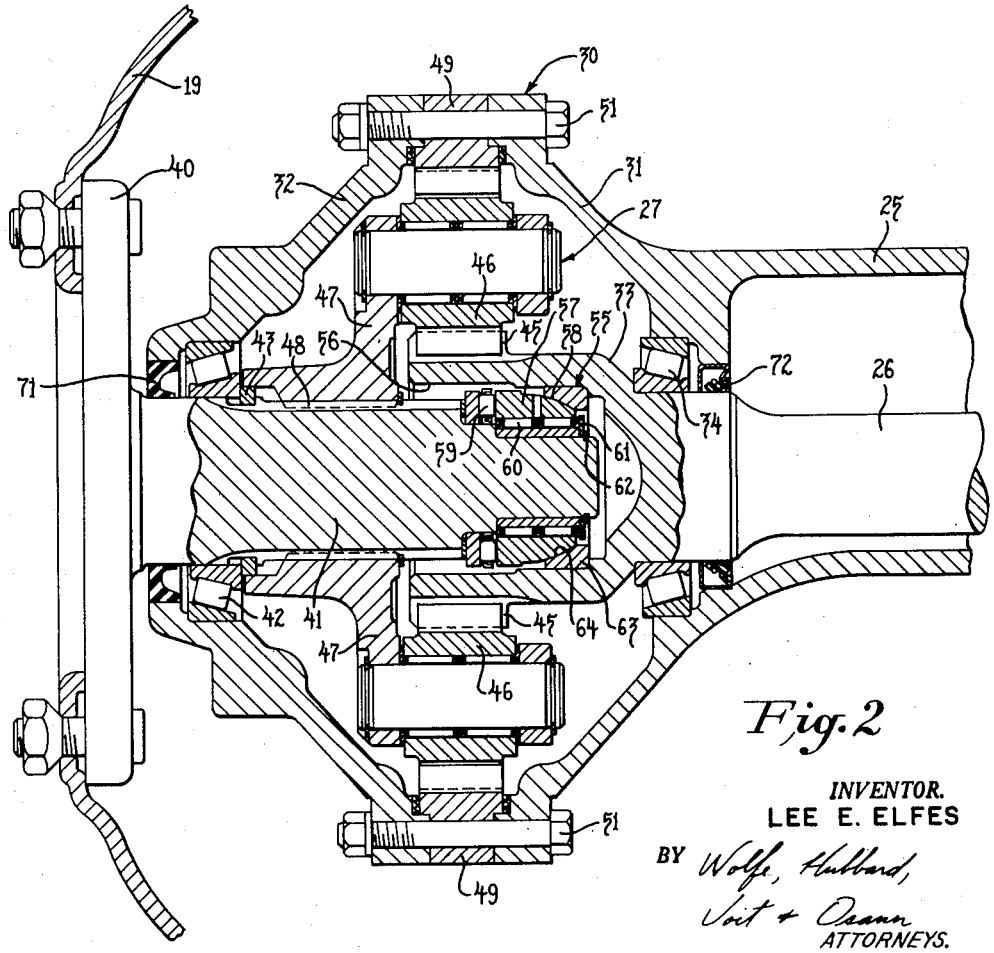

Other objects and advantages of the invention will become apparent upon reading the following detailed description and upon reference to the drawings in which:

FIGURE 1 is a plan view of a tractor embodying the present invention and having a portion of one of its rear wheels broken away; and FIG. 2 is a fragmentary section taken approximately along the line 2—2 of FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown in FIG. 1 a tractor 10 having a rear axle assembly 15 which embodies the present invention. The tractor 10 also includes front steering wheels 16, a power plant 17, an operator's control position 18, rear drive wheels 19, and an implement hitch linkage including a pair of draft links 20.

In keeping with the invention, the axle assembly 15 includes a frame in the form of an axle tube 25 that journals an axle 26 which is coupled to the drive wheels 19 through planetary gear systems at each end of the axle assembly. As the construction at each end of the axle assembly is substantially the same, only the assembly at the left end of the axle which includes a planetary gear system 27 will be discussed in detail. Considering primarily FIG. 2, the gear system 27 is disposed in a housing 30 formed, in part, by a flanged outer end 31 of the tube 25 and an opposed cover plate 32. The axle 26 is formed with an end portion 33 that extends into the housing 30 and which is journaled in a conical, radial bearing 34. The bearing 34 is of a standard type which journals the axle 26 for rotation within the tube 25 and which also resists thrust forces on the axle exerted toward the right in FIG. 2.

The wheel 19 is mounted on a hub 40 which includes a stub shaft 41 that also extends into the housing 30. The stub shaft 41 is journaled by a conical radial bearing 42 mounted in the cover plate 32 so as to resist thrust forces exerted on the stub shaft toward the left in FIG. 2. A lock ring 43, carried by the stub shaft 41, about the bearing 42 and prevents withdrawal of the stub shaft from the housing.

In the illustrated embodiment, the planetary gear system 27 rotatably coupling the axle 26 and the wheel 19 includes a sun gear 45 formed on the outer surface of the axle end portion 33, planet gears 46 journaled on a planet gear carrier 47 that is splined at 48 to the stub shaft, and a ring gear 49 which is sandwiched between the flanged tube end 31 and the cover plate 32. Preferably, a series of peripherally spaced bolts 51 rigidly secure the flanged end 31, ring gear 49 and cover plate 32 in assembled relation.

Pursuant to the invention, a bearing assembly 55, snugly interposed between the stub shaft 41 and the axle end portion 33, forms a self alining connection permitting relative rotation between the axle and the wheel. In the illustrated construction, the end of the stub shaft 41 extends into a cylindrical socket 56 formed in the outer end of the axle 26 and the bearing assembly 55 is fitted into this socket. Preferably, the bearing assembly includes a part 57 having an outer spherical surface 58 and which is carried on the stub shaft 41 by thrust and radial bearings 59 and 60, respectively. The part 57 and the bearings 59 and 60 are all secured in assembled relation by a retainer 61 held in place at the outer end of the stub shaft 41 by a snap ring 62. Cooperating with the bearing part 57 is a second bearing part 63 having an inner spherical surface 64 in snug interfitting engagement with the spherical surface 58 on the part 57. The second part 63 is tightly fitted within the axle socket 56.

In order to lubricate the gear system 27 and the several bearings within the housing 30, seals 71 and 72 are placed at the opposite ends of the housing and the housing is charged with a suitable lubricant.

It can be seen that the assembly described above provides very solid support both for the drive wheel 19 and the drive axle 26. The axle end portion 33 is locked against axial movement in either direction between the bearing 34 and the bearing assembly 55. The stub shaft 41 is locked against axial movement in either direction between the bearing 42 and the bearing assembly 55. Axial forces exerted in either direction through the bearing assembly 55 are resisted by one or the other of the conical radial bearings 34, 42. The assembly is thus tight fitting and solid.

It will also be understood by those skilled in the art that the construction embodying the invention is quite easy to assemble. Briefly summarized, the assembly operation simply requires the axle 26 to be fitted into the tube 25 until the end portion 33 is received in the bearing 34. The part 57 and its associated thrust and radial bearings 59, 60 are fitted on the end of the stub shaft 41 and are locked in place by the retainer 61. The cover plate 32 and the planet gear carrier, together with its planet gears, are assembled on the stub shaft 41. As the final assembly operation, the stub shaft 41 is fitted into the socket 56, the ring gear 49 is sandwiched between the cover plate 32 and the flanged tube end portion 31, and the entire assembly locked into place by tightening the bolts 51.

It will also be seen that because of the self-adjusting flexibility between the wheel 19 and the axle 26, the parts may operate without undue strain and can be manufactured with normal production tolerances. The construction is also quite rugged so as to withstand the heavy-duty usages to which vehicles such as agricultural tractors are normally subjected.

I claim as my invention:

1. A drive axle assembly for a tractor or the like comprising, in combination, a hollow axle tube having a housing at one end, an axle journaled in said tube and having an end portion extending into said housing and fitted against a conical radial bearing seated in said tube, a wheel having a stub shaft extending into said housing and journaled in a second conical radial bearing, means operative between said second conical radial bearing and said stub shaft preventing withdrawal of the stub shaft from the housing, said axle end portion and said stub shaft being rotatably coupled by a sun gear and planet gears cooperating with a ring gear fixed with respect to said housing, and a bearing assembly snugly interposed between said end portion and said stub shaft, said bearing assembly including a pair of interfitting, spherical-surfaced parts forming a self-alining connection between the stub shaft and the axle end portion, one of said parts being carried on both radial and thrust bearings opposing the forces transmitted thereto by the other part.

2. A drive axle assembly for a tractor or the like comprising, in combination, a hollow axle tube having a two part housing at one end, an axle journaled in said tube and having an end portion extending into said housing and fitted against a conical radial bearing seated in said tube, a wheel having a stub shaft extending into said housing and journaled in second a conical radial bearing, means operative between said second conical radial bearing and said stub shaft preventing withdrawal of the stub shaft from the housing, a ring gear sandwiched between the two parts of said housing, said axle end portion and said stub shaft being rotatably coupled by a sun gear and planet gears cooperating with said ring gear, and a bearing assembly snugly interposed between said end portion and said stub shaft, said bearing assembly including a pair of interfitting, spherical-surfaced parts forming a self-alining connection between the stub shaft and the axle end portion, one of said parts being carried on both radial and thrust bearings opposing the forces transmitted thereto by the other part.

3. A drive axle assembly for a tractor or the like comprising, in combination, a hollow axle tube having a housing at one end, an axle journaled in said tube and having an end portion extending into said housing and fitted against a conical radial bearing seated in said tube, a wheel having a stub shaft extending into said housing and journaled in a second conical radial bearing, means operative between said second conical radial bearing and said stub shaft preventing withdrawal of the stub shaft from the housing, said stub shaft extending axially into a cylindrical socket formed in the end of said axle end portion, a sun gear formed on the outer surface of said axle end portion, a planet gear carrier splined to said stub shaft, planet and ring gears coupling said gear carrier and said sun gear, a bearing part having an outer spherical surface carried on both thrust and radial bearings at the end of said stub shaft, a second bearing part seated in said cylindrical socket and having a spherical surface in snug interfitting engagement with the spherical surface of said first part, said parts thus forming a self-alining connection permitting relative rotation between the axle and the wheel.

4. A drive axle assembly for a tractor or the like comprising, in combination, a frame, an axle having an end portion journaled in a conical radial bearing seated in said frame, a wheel having a stub shaft journaled in a second conical radial bearing on said frame, means operative between said second conical radial bearing and said stub shaft preventing withdrawal of the stub shaft from the frame, said stub shaft extending axially into a cylindrical socket formed in the end of said axle end portion, a sun gear formed on the outer surface of said axle end portion, a planet gear carrier mounted on said stub shaft, planet and ring gears coupling said gear carrier and said sun gear, a bearing part having an outer spherical surface carried on both thrust and radial bearings at the end of said stub shaft, a second bearing part seated in said cylindrical socket in snug interfitting engagement with said first part and thus forming a self-alining connection permitting relative rotation between the axle and the wheel.

References Cited in the file of this patent

UNITED STATES PATENTS

| 1,370,378 | Starr | Mar. 1, 1921 |
| 1,372,627 | Midboe | Mar. 22, 1921 |
| 1,490,375 | Foote | Apr. 15, 1924 |
| 1,768,225 | Whitney | June 24, 1930 |
| 1,974,230 | Armington | Sept. 18, 1934 |
| 2,386,917 | Thornton | Oct. 16, 1945 |
| 2,424,578 | Mortag | July 29, 1947 |
| 2,543,811 | Snow et al. | Mar. 6, 1951 |
| 2,776,583 | Williams | Jan. 8, 1957 |
| 2,858,897 | Sibley | Nov. 4, 1958 |

OTHER REFERENCES

Design News, pp. 28–29, July 21, 1958.